United States Patent
Fujii et al.

(10) Patent No.: US 7,933,057 B2
(45) Date of Patent: Apr. 26, 2011

(54) OSCILLATOR DEVICE, OPTICAL DEFLECTOR AND IMAGE FORMING APPARATUS USING THE OPTICAL DEFLECTOR

(75) Inventors: Kazunari Fujii, Kawasaki (JP); Takahiro Akiyama, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/525,133

(22) PCT Filed: Mar. 24, 2008

(86) PCT No.: PCT/JP2008/056251
§ 371 (c)(1),
(2), (4) Date: Jul. 30, 2009

(87) PCT Pub. No.: WO2008/123475
PCT Pub. Date: Oct. 16, 2008

(65) Prior Publication Data
US 2010/0092213 A1    Apr. 15, 2010

(30) Foreign Application Priority Data
Mar. 23, 2007    (JP) .................... 2007-075705

(51) Int. Cl.
*G02B 26/08*    (2006.01)
(52) U.S. Cl. ............... 359/224.1; 359/199.1; 359/199.2; 359/199.3; 359/199.4; 359/224.2
(58) Field of Classification Search .... 359/199.1–199.4, 359/213.1–215.1, 224.1–224.2; 310/36–37, 310/66
See application file for complete search history.

(56) References Cited

U.S. PATENT DOCUMENTS

| 4,859,846 | A | 8/1989 | Burrer |
| 5,047,630 | A | 9/1991 | Confer et al. |
| 5,483,059 | A | 1/1996 | Igaki et al. |
| 6,270,224 | B1 | 8/2001 | Sunaga et al. |
| 6,278,553 | B1 | 8/2001 | Akiyama |
| 6,335,837 | B1 | 1/2002 | Aratani et al. |
| 7,149,017 | B2 | 12/2004 | Kandori et al. |
| 7,242,506 | B2 | 7/2007 | Kandori et al. |
| 7,643,197 | B2 | 1/2010 | Kato et al. |
| 2006/0152785 | A1 | 7/2006 | Yasuda et al. |
| 2006/0198006 | A1* | 9/2006 | Kato et al. ............ 359/224 |
| 2008/0316560 | A1 | 12/2008 | Kandori et al. |

FOREIGN PATENT DOCUMENTS

| JP | 9-230277 | 9/1997 |
| JP | 2003-279879 | 10/2003 |

OTHER PUBLICATIONS

International Search Report of PCT/JP2008/056251 mailed Jul. 31, 2008.

* cited by examiner

*Primary Examiner* — James Phan
(74) *Attorney, Agent, or Firm* — Fitzpatrick, Cella, Harper & Scinto (57) ABSTRACT

An oscillation system includes first and second oscillation movable elements supported by respective elastic supporting elements. The oscillation system has a first natural oscillation mode of a resonance frequency $f_1$ and a second natural oscillation mode of a resonance frequency of $f_2$ which is approximately N-fold of $f_1$ where N is a natural number. A control device determines set driving frequencies $Df_1$ and $Df_2$ in accordance with a predetermined equation while satisfying a relation $Df_2=N\times Df_1$ and drives the oscillation system at the set driving frequencies through a driving member.

12 Claims, 6 Drawing Sheets

FIG. 8

OSCILLATOR DEVICE, OPTICAL DEFLECTOR AND IMAGE FORMING APPARATUS USING THE OPTICAL DEFLECTOR

TECHNICAL FIELD

This invention relates to an oscillator device having a plurality of oscillators and, more particularly, to an oscillator device which is suitably applicable to an optical deflector. In another aspect, the invention concerns a scanning display unit or an mage forming apparatus such as a laser beam printer or a digital copying machine, for example, having such optical deflector.

BACKGROUND ART

A large variety of optical deflectors having a resonance-oscillated mirror have been proposed. The resonance type optical deflector has the following features, as compared with a conventional optical-scanning optical system using a rotary polygonal mirror such as a polygon mirror: that is, the size of the device can be made very small and the power consumption can be kept low. Particularly, an optical deflector comprising Si monocrystal, which is produced through the semiconductor process, has theoretically no metal fatigue and thus the durability thereof is very good.

On the other hand, in the resonance type deflector, since the deflection angle (displacement angle) of the mirror theoretically changes sinusoidally, the angular speed of deflected light is not constant. The following techniques have been proposed to correct this characteristic (see U.S. Pat. Nos. 4,859,846 , 5,047,630 and U.S. Patent Application Publication No. 2006/0,152,785).

In U.S. Pat. Nos. 4,859,846 and 5,047,630, a resonance type deflector having an oscillation mode based on a fundamental frequency and a frequency three-fold the fundamental frequency, is used to achieve the driving in which the deflection angle of the mirror changes like a chopping wave.

Figure 8:
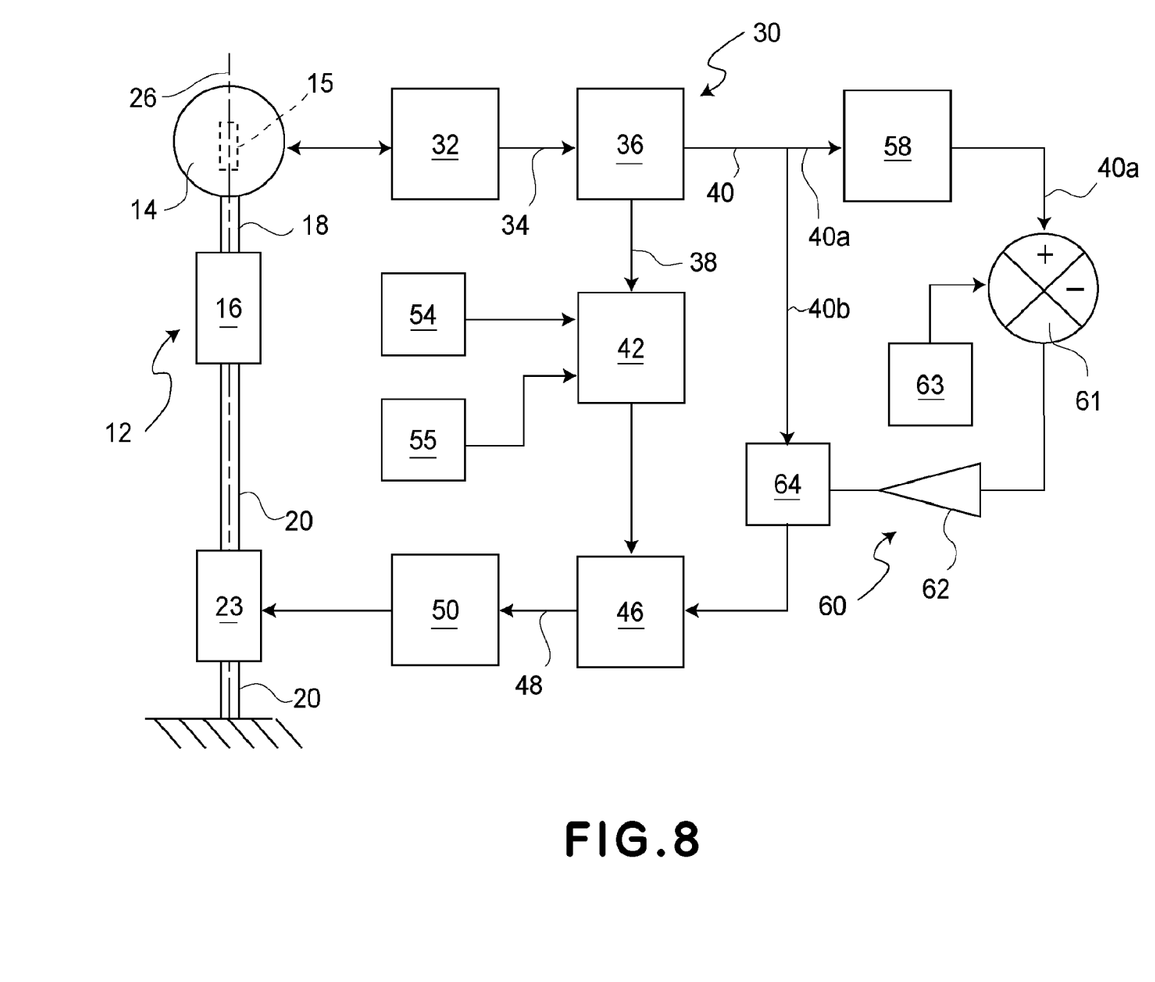
FIG. 8 is a diagram explaining a conventional example.

FIG. 8 shows a micromirror which realizes such chopping-wave drive. In FIG. 8, an optical deflector 12 is comprised of oscillators 14 and 16, elastic supporting members 18 and 20, driving members 23 and 50, detecting elements 15 and 32, and a control circuit 30. This micromirror has a fundamental resonance frequency and a resonance frequency approximately three-fold the fundamental frequency, and it is driven at a combined frequency of the fundamental frequency and the three-fold frequency. Based on this, the oscillator 14 having a mirror surface is driven by a chopping-wave drive, such that optical deflection with a smaller angular speed change in the deflection angle is accomplished as compared with the sinusoidal drive.

During the driving, the oscillation of the oscillator 14 is detected by the detecting elements 15 and 32, and a driving signal necessary for the chopping wave is generated by the control circuit 30. The driving signal is inputted to the driving members 23 and 50, by which the micromirror is driven. As described above, since the angular speed of the scanning deflection has an approximately-constant angular-speed region which is wide as compared with a case where the displacement angle is based on a sinusoidal wave, the available region relative to the whole area of scanning deflection can be widened.

Furthermore, the drive is performed in accordance with the fundamental frequency and a frequency three-fold the fundamental frequency or, alternatively, a driving frequency based on a three-fold frequency and a one-third frequency of that.

In an oscillation system comprising a plurality of oscillating movable elements and a plurality of elastic supporting members, a drive close to a saw-tooth wave drive or a triangular-waveform drive can be realized by setting the resonance frequency ratio of plural natural oscillation modes for the driving to an integral-number ratio. However, due to a manufacturing error or an environmental change, it is difficult to set the resonance frequencies of the natural oscillation modes of the oscillator device exactly at the integral-number ratio.

For example, it is now assumed that the resonance frequency f1 of a first natural oscillation mode and the resonance frequency f2 of a second natural oscillation mode are not in a precisely two-fold relationship but rather they are in an approximately two-fold relationship. Here, the driving will be carried out while a first driving frequency Df1 is made equal to the resonance frequency f1 of the first natural oscillation mode, and a second driving frequency Df2 is set to a frequency n-fold the first driving frequency Df1 (n is an integer). Then, the second driving frequency Df2 would be largely deviated from the resonance frequency f2 of the second natural oscillation mode. As a result of this, degradation of the driving efficiency and the like occurs, and it becomes very difficult to obtain the driving of the movable element exactly in accordance with a desired scanning waveform. This problem occurs when the relationship of the resonance frequencies of plural natural oscillation modes does not match the design value (it is deviated from the designed integral-number ratio). For example, a similar problem may occur even in a case where the ratio is approximately an integral-number ratio other than approximately two-fold (e.g., approximately three-fold). Here, the word "approximately" is referred to so as to exclude a case where the ratio is exactly an n-fold (n is an integer).

DISCLOSURE OF THE INVENTION

In accordance with an aspect of the present invention, there is provided an oscillator device including an oscillation system, a driving member configured to drive said oscillation system, and a control device configured to determine a driving force to be applied from said driving member to said oscillation system, characterized in that: said oscillation system includes a first oscillation movable element, a second oscillation movable element and a support member; said first oscillation movable element is supported by a first elastic supporting element, for torsional oscillation relative to said second oscillation movable element and around an oscillation axis; said second oscillation movable element is supported by a second elastic supporting element, for torsional oscillation relative to said support member and around the oscillation axis; said oscillation system has first and second natural oscillation modes of different frequencies around the oscillation axis, wherein, when a resonance frequency of the first natural oscillation mode is $f_1$ while a resonance frequency of the second natural oscillation mode is $f_2$ and N is an integer not less than 2, a relation $$0.98N \leq f_2/f_1 \leq 1.02N$$

(where a case $f_2/f_1 = N$ is excluded) is satisfied; said control device is arranged to determine set driving frequencies $Df_1$ and $Df_2$ in accordance with relations $$Df_1 = (\beta_1 \times N \times f_1 + \alpha_2 \times f_2)/N$$

$$Df_2 = (\alpha_1 \times N \times f_1 + \alpha_2 \times f_2)$$

$$\alpha_1 + \alpha_2 = 1$$

$\alpha_1 > 0$ $\alpha_2 > 0$ and so as to satisfy a relation $Df_2 = N \times Df_1$; and said oscillation system is driven by said driving member in accordance with the set driving frequencies $Df_1$ and $Df_2$.

In accordance with another aspect of the present invention, there is provided an oscillator device including an oscillation system, a driving member configured to drive said oscillation system, and a control device configured to determine a driving force to be applied from said driving member to said oscillation system, characterized in that: said oscillation system includes a first oscillation movable element, a second oscillation movable element, a third oscillation movable element and a support member; said first oscillation movable element is supported by a first elastic supporting element, for torsional oscillation relative to said second oscillation movable element and around an oscillation axis; said second oscillation movable element is supported by a second elastic supporting element, for torsional oscillation relative to said third elastic supporting element and around the oscillation axis; said third oscillation movable element is supported by a third elastic supporting element, for torsional oscillation relative to said support member and around the oscillation axis; said oscillation system has first, second and third natural oscillation modes of different frequencies around the oscillation axis, wherein, when a resonance frequency of the first natural oscillation mode is $f_1$, a resonance frequency of the second natural oscillation mode is $f_2$, a resonance frequency of the third natural oscillation mode is $f_3$, and M and N are integers not less than 2, relations $0.98M \leq f_2/f_1 \leq 1.02M$ (where a case $f_2/f_1 = M$ is excluded)

$0.98N \leq f_3/f_1 \leq 1.02N$ (where a case $f_3/f_1 = N$ is excluded)

$M \neq N$ are satisfied; said control device is arranged to determine set driving frequencies $Df_1$, $Df_2$ and $Df_3$ in accordance with relations $Df_1 = (\alpha_1 \times N \times M \times f_1 + \alpha_2 \times N \times f_2 + \alpha_3 \times M \times f_3)/MN$ $Df_2 = (\alpha_1 \times N \times M \times f_1 + \alpha_2 \times N \times f_2 + \alpha_3 \times M \times f_3)/N$ $Df_3 = (\alpha_1 \times N \times M \times f_1 + \alpha_2 \times N \times f_2 + \alpha_3 \times M \times f_3)/M$ $\alpha_1 + \alpha_2 + \alpha_3 = 1$ $\alpha_1 > 0$ $\alpha_2 > 0$ $\alpha_3 > 0$ and so as to satisfy relations $Df_2 = M \times Df_1$ $Df_3 = N \times Df_1$; and said oscillation system is driven by said driving member in accordance with the set driving frequencies $Df_1$, $Df_2$ and $Df_3$.

In accordance with a further aspect of the present invention, there is provided an optical deflector including an oscillator device as recited above, wherein said first oscillation movable element has an optical deflecting element.

In accordance with a yet further aspect of the present invention, there is provided an image forming apparatus including an optical deflector as recited above, an optical system, a light source and a photosensitive member, wherein a light beam from said light source is scanningly deflected by said optical deflector, and the scanningly deflected light is collected at a target position on said photosensitive member by said optical system.

Briefly, in accordance with the present invention, in an oscillation system comprising a plurality of oscillation movable elements and a plurality of elastic supporting members, even if the ratio of the resonance frequencies of a plurality of natural oscillation modes of the driving object is deviated from an integer-number ratio, the oscillation system can be driven efficiently at the driving frequencies of an integer-number ratio in which the deviation with respect to the resonance frequency is distributed appropriately.

These and other objects, features and advantages of the present invention will become more apparent upon a consideration of the following description of the preferred embodiments of the present invention taken in conjunction with the accompanying drawings.

BEST MODE FOR PRACTICING THE INVENTION

The present invention concerns an oscillation system which comprises a plurality of oscillation movable elements and a plurality of elastic supporting members, and provides an oscillator device or an optical deflector in which the oscillation system is driven at an appropriate driving frequency and efficiently in a desired manner. One preferred form of the present invention will be explained below.

[Device Structure]

Figure 1:
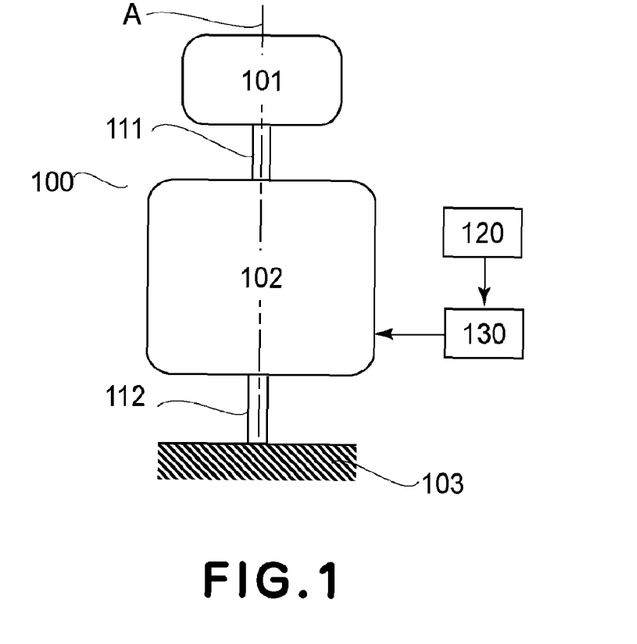
FIG. 1 is a block diagram for explaining an oscillator device in an embodiment of the present invention, as well as an optical deflector according to a first embodiment of the present invention.

FIG. 1 is a block diagram of an oscillator device according to one preferred from of the present invention. The oscillation system 100 of the oscillator device in this preferred from of the invention comprises a first oscillation movable element 101, a second oscillation movable element 102 and a support member 103. The first oscillation movable element 101 is supported by a first elastic supporting element 111, for torsional oscillation relative to the second oscillation movable element 102 and around an oscillation axis A. The second oscillation movable element 102 is supported by a second elastic supporting element 112, for torsional oscillation relative to the support member 103 and around the oscillation axis A. The oscillation axis A is defined by an axis of torsional motion of the elastic supporting elements 111 and 112.

Furthermore, if an optical deflection element such as a reflection member is formed on the surface of the first oscillation movable element, for example, the oscillator device can be used as an optical deflector. With regard to the reflection member, a metal film such as aluminum may be formed by a sputtering method.

The oscillation system 100 has a first natural oscillation mode and a second natural oscillation mode of different frequencies around the oscillation axis. When the resonance frequency of the first natural oscillation mode is denoted by $f_1$ and the resonance frequency of the second natural oscillation mode is denoted by $f_2$, the oscillation system 100 is structured beforehand so that the resonance frequencies $f_1$ and $f_2$ are in an approximately 1:N relationship, where N is an integer not less than 2. Here, the "approximately 1:N relationship" of $f_1$ and $f_2$ means that there is a relation of $0.98N \leq f_2/f_1 \leq 1.02N$ (where a case $f_2/f_1 = N$ is excluded). The reason why $f_2/f_1 = N$ is excluded here for $f_1$ and $f_2$ is that, if the ratio of $f_1$ and $f_2$ is exactly at an integral-number ratio, the driving frequencies had better be set at $f_1$ and $f_2$, respectively.

Furthermore, if for example N=2, the oscillation movable element can be driven in accordance with a sawtooth-like waveform (see U.S. Patent Application Publication No. 2006/0152785).

Furthermore, if for example N=3, the oscillation movable element can be driven in accordance with a chopping-wave-like waveform (see U.S. Pat. No. 4,859,846).

The possible cause for deviation of the resonance frequency of each natural oscillation mode from the integral-number ratio may be a manufacturing error of or a change in the shape of the oscillation system 100 due to an environment temperature change or a variation with time. The present invention proposes a process for determining the driving frequency by which the oscillation system can be driven efficiently even in an occasion where the ratio of $f_1$ and $f_2$ is not exactly an integral-number ratio (n-fold where n is an integer).

The driving member 130 is configured to apply a driving force to the oscillation system 100 based on an electromagnetic system, an electrostatic method or a piezoelectric method, for example. In the case of electromagnetic driving, as an example a permanent magnet may be provided on at least one oscillation movable element, and an electric coil for applying a magnetic field to this permanent magnet may be disposed adjacent the oscillation movable element. Alternatively, the permanent magnet and the electric coil may be disposed in a reverse manner.

In the case of electrostatic driving, an electrode may be formed on at least one oscillation movable element, and another electrode for providing an electrostatic force acting between it and the former electrode may be provided adjacent the oscillation movable element.

In the case of piezoelectric driving, a piezoelectric device may be provided in the oscillation system or at the support member to apply the driving force.

Furthermore, in the oscillator device in this preferred form of the present invention, a resonance frequency detecting element which measures the resonance frequency of the oscillation system may be provided. With regard to such resonance frequency detecting element, it may comprise a photodetector, for example, to receive reflected light of a light beam reflected by the oscillation movable element, and the resonance frequency can be detected based on the passage timing thereof.

Other methods may include one in which a piezo-sensor is provided at the elastic supporting element, one in which a capacitance sensor is used, and one in which a magnetic sensor is used.

[Driving Signal]

Next, the driving signal of the oscillator device according to this preferred form of the present invention will be explained.

In this preferred form, the oscillation system of the oscillator device has two natural oscillation modes and it is so driven that the oscillation of one of the oscillation movable elements can be expressed by an equation which includes at least a term "$A_1 \sin \omega t + A_2 \sin(n\omega t + \theta)$" where n is an integer not less than 2. Here, A1 and A2 are amplitude components, $\theta$ is a relative phase difference, $\omega$ is an angular frequency, and t is time. It should be noted that the driving signal may comprise any signal as long as the oscillation movable element is oscillated as can be expressed by the aforementioned equation. For example, it may be a driving signal generated by synthesizing a sinusoidal wave. Alternatively, it may be a pulse-like driving signal. In the case of the driving signal produced by synthesizing a sinusoidal wave, the driving signal may be, for example, a signal that can be expressed by an equation which includes a term "$B_1 \sin \omega t + B_2 \sin(n\omega t + \phi)$" where n is an integer not less than 2. Here, B1 and B2 are amplitude components, $\phi$ is a relative phase difference, $\omega$ is an angular frequency, and t is time. In this case, a desired driving signal can be obtained by adjusting the amplitude and phase of each sinusoidal wave.

Furthermore, when the driving is made based on a pulse-like signal, a desired driving signal can be generated by changing the number of pulses, pulse spacing and pulse width, etc., with respect to time.

Next, a driving signal in a case where the oscillation system has a first natural oscillation mode and a second natural oscillation mode, having different frequencies, around an oscillation axis, will be explained.

When, like the foregoing description, the resonance frequency of the first natural oscillation mode is denoted by $f_1$, the resonance frequency of the second natural oscillation mode is denoted by $f_2$, and N is an integer not less than 2, in this preferred form of the present invention the oscillation system has a relationship of "$0.98N \leq f_2/f_1 \leq 1.02N$" where a case $f_2/f_1 = N$ is excluded.

In this case, the control unit determines the set driving frequencies $Df_1$ and $Df_2$ based on relations:

$$Df_1 = (\alpha_1 \times N \times f_1 + \alpha_2 \times f_2)/N$$

$$Df_2 = (\alpha_1 \times N \times f_1 + \alpha_2 \times f_2)$$

$$\alpha_1 + \alpha_2 = 1$$

$$\alpha_1 > 0$$

$$\alpha_2 > 0$$

and so as to satisfy a relation $$Df_2 = N \times Df_1$$

where N is an integer not less than 2.

Here, $\alpha_1$ and $\alpha_2$ are weighting coefficients used when the set driving frequencies $Df_1$ and $Df_2$ are determined. For example, as the value of $\alpha_1$ becomes smaller (as the value of $\alpha_2$ becomes larger), the values of $Df_1$ and $Df_2$ shift to the $f_2$ side. On the contrary, as value of $\alpha_1$ becomes larger (as the value of $\alpha_2$ becomes smaller), the values of $Df_1$ and $Df_2$ shift to the $f_1$ side. In this case, $Df_1$ and $Df_2$ are determined while keeping the relationship "$Df_2=N \times Df_1$" (N is an integer not less than 2) satisfied.

In this preferred form of the present invention, most appropriate driving frequencies $Df_1$ and $Df_2$ can be set by adjusting the values of $\alpha_1$ and $\alpha_2$.

[Method of Determining $\alpha_1$ and $\alpha_2$]

Next, a method of determining $\alpha_1$ and $\alpha_2$ will be explained.

First of all, the method to determining $\alpha_1$ and $\alpha_2$ based on the sharpness of the resonance peak (i.e., the magnitude of half-width or mechanical Q-value or the like) will be explained.

Now, it is assumed, for example, that the resonance peak of the resonance frequency $f_1$ of the first natural oscillation mode is sharper (having a smaller half-width or a larger mechanical Q-value) than the resonance peak of the resonance frequency $f_2$ of the second natural oscillation mode. In this case, the degradation of the driving efficiency when the driving frequency deviates from the resonance frequency becomes more remarkable with the resonance frequency $f_1$ which has a sharper resonance peak than the resonance frequency $f_2$. Thus, the driving efficiency of the oscillation system 100 can be made higher by shifting the driving frequency $Df_2$ from $f_2$ having a relatively broad resonance peak, than by shifting the driving frequency $Df_1$ from $f_1$ having a relatively sharp resonance peak.

In this case, the values of $\alpha_1$ and $\alpha_2$ are set to satisfy a relationship $\alpha_1 > \alpha_2$, so that the driving frequencies $Df_1$ and $Df_2$ are shifted toward the resonance frequency $f_1$. Then, the value of $\alpha_1$ is adjusted in consideration of the sharpness of the resonance peak of $f_1$. More specifically, if the resonance peak of $f_1$ is very sharp, the value of $\alpha_1$ is made close to 1 to prevent the driving frequency $Df_1$ from deviating away from the resonance peak of $f_1$. However, it is possible that, if $Df_1$ is made too close to $f_1$, $Df_2$ may deviate away from $f_2$ and the driving efficiency may be degrade to the contrary. Hence, $Df_1$ and $Df_2$ should be determined while taking into account the sharpness of both peaks of $f_1$ and $f_2$.

Although the foregoing description has been made to an example wherein the resonance peak of $f_1$ is sharper than the resonance peak of $f_2$, the same applies to a reverse case (the resonance peak of $f_2$ is sharper than the resonance peak of $f_1$). In that case, $\alpha_1$ and $\alpha_2$ may be determined to satisfy $\alpha_1 < \alpha_2$.

It should be noted that the resonance peak can be detected by using a resonance frequency detecting element. For example, the resonance peak can be obtained by sweeping the driving frequency in the vicinity of the resonance frequency.

Next, a method of determining $\alpha_1$ and $\alpha_2$ based on parameters of the driving signal will be explained.

When the oscillation system is driven, the driving electric power as the first and second natural oscillation modes reach their target amplitude becomes lower as the driving frequencies $Df_1$ and $Df_2$ are made closer to their resonance peak ($f_1$ and $f_2$). This is for the reason that the efficiency is better if the oscillation system is driven at the resonance peak. For example, if the driving signal is $D(t)=B_1 \sin \omega t + B_2 \sin(n\omega t + \Phi)$, $\alpha_1$ and $\alpha_2$ are so determined that the amplitude components $B_1$ and $B_2$ of the driving signal (driving electric power or driving voltage) become minimum. On the other hand, if the maximum allowable value for the driving electric power is predetermined, $\alpha_1$ and $\alpha_2$ may be so determined that the driving is made by a driving electric power or a driving voltage which is smaller than this maximum allowable value.

Namely, the driving frequencies can be set so that the driving electric power necessary for each driving frequency when the natural oscillation modes reach their target amplitudes becomes lower than the maximum allowed value of the driving electric power. Furthermore, the driving frequencies may be set so that the grand total of the driving electric powers necessary for each driving frequency when the natural oscillation modes reach their target amplitudes is minimized. On the other hand, the driving frequencies may be set so that the grand total of the drive voltages necessary for the driving frequency when the natural oscillation modes reach their target amplitudes is minimized.

When the driving frequency is set based on these techniques, the first set driving frequency corresponding to $f_1$ should be multiplied by a natural number to determine the second set driving frequency corresponding to $f_2$.

Next, preferred embodiments of the present invention will be described with reference to the attached drawings.

First Embodiment

FIG. 1 is a block diagram of an optical deflector according to a first embodiment of the present invention. An oscillation system 100 of the optical deflector of the present embodiment comprises a first oscillation movable element 101 having an optical deflecting element such as a reflection surface, a second oscillation movable element 102, and a support member 103. The first oscillation movable element 101 is supported by a first elastic supporting element 111, for torsional oscillation relative to the second oscillation movable element 102 and around an oscillation axis A. The second oscillation movable element 102 is supported by a second elastic supporting element 112, for torsional oscillation relative to the support member 103 and around the oscillation axis A. The oscillation axis A is defined by the axis of torsional motion of the elastic supporting elements 111 and 112. The oscillation system 100 has a first natural oscillation mode and a second natural oscillation mode of different frequencies, around the oscillation axis.

When the resonance frequency of the first natural oscillation mode is denoted by $f_1$ and the resonance frequency of the second natural oscillation mode is denoted by $f_2$, the oscillation system 100 is structured beforehand so that the resonance frequencies $f_1$ and $f_2$ are in an approximately 1:2 relationship. However, the resonance frequencies of the natural oscillation modes will vary due to a manufacturing error of or a change in the shape of the oscillation system 100 caused by an environment temperature change or a variation with respect to time. Hence, in this embodiment, the driving frequency is set in the manner to be described below to meet such changes, such that the oscillation system 100 can be driven in a desired fashion.

The method of setting the driving frequency in the present embodiment will be explained. In the present embodiment, while the sharpness of the resonance peak is used as a reference, two driving frequencies are set. The value Q which depicts the sharpness of the resonance peak will now be explained.

Figure 2:
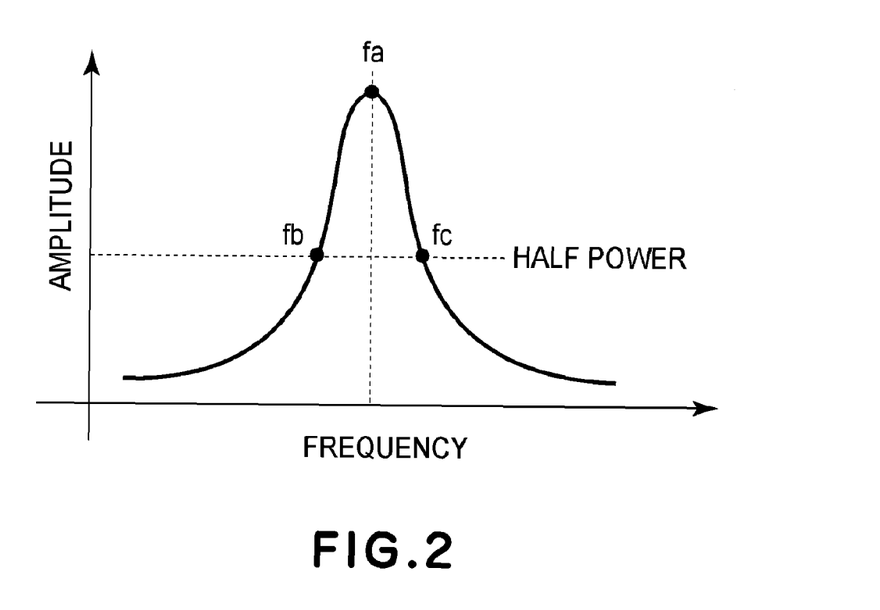
FIG. 2 is a diagram explaining a resonance curve of an oscillation system.

As shown in FIG. 2, the resonance frequency at the resonance peak is $f_a$, the frequency with which the oscillation energy at the low-frequency side of the resonance peak becomes equal to a half value of the resonance peak is $f_b$, the frequency with which the oscillation energy at the high-frequency side of the resonance peak becomes equal to a half value of the resonance peak is $f_c$. Then, the value Q that represents the sharpness of the resonance peak is defined by Equation (1) below.

$$Q = f_a / (f_c - f_b) \qquad (1)$$

Here, the sharpness of the resonance peak of the first natural oscillation mode is denoted by $Q_1$, and the sharpness of the resonance peak of the second natural oscillation mode is denoted by $Q_2$. It is seen from Equation (1) that, since the width of the frequency bandwidth which can resonate is narrowed as the Q becomes larger, if the driving frequency deviates from the resonance frequency, the degradation rate of the driving efficiency is large.

With regard to the resonance frequency of the oscillation system 100, $f_2$ should preferably be made exactly two-fold of $f_1$. Actually, however, there is an error due to a manufacturing error of the movable elements 101 and 102 or the elastic supporting elements 111 and 112. Therefore, when the oscillation system is going to be driven with two driving frequencies in the 1:2 relationship, it has to be driven while at least one of the driving frequencies is deviated from an associated resonance frequency. In this embodiment, with regard to the degree of fewness of deviation of the driving frequency from the resonance frequency, weighting is carried out based on the resonance peak sharpness $Q_1$ and $Q_2$, and the driving frequencies are so set around the resonance frequencies that the driving frequency ratio is brought into a predetermined relationship.

More specifically, a control unit 120 which determines the driving force to be applied from the driving member 130 for driving the oscillation system 100, stores therein the resonance frequencies $f_1$ and $f_2$ and sharpness $Q_1$ and $Q_2$ of the resonance peak, in response to an external output. Then, for simultaneous excitation of the two natural oscillation modes of the oscillation system 100, the control unit 120 determines the set driving frequencies $Df_1$ and $Df_2$ of frequencies having a frequency ratio of 1:2, on the basis of the relationship of Equation (2) below.

$$Df_1=(\alpha_1 \times N \times f_1 + \alpha_2 \times f_2)/N$$

$$Df_2=(\alpha_1 \times N \times f_1 + \alpha_2 \times f_2) \ (=N \times Df_1) \quad (2)$$

$$\alpha_1+\alpha_2=1$$

$$\alpha_1>0$$

$$\alpha_2>0$$

$$\alpha_1=Q_1/(Q_1+Q_2)$$

$$N=2$$

In this manner, when the sharpness of the resonance peak of each natural oscillation mode is denoted by $Q_i$ (i is 1 or 2), the control unit 120 determines the aforementioned coefficient $\alpha_i$ as a value obtainable by dividing a corresponding $Q_i$ by the ground total of Q. However, the method of determining the coefficient $\alpha_i$ is not limited to this. Any method may be used provided that the conditions $\alpha_1+\alpha_2=1$, $\alpha_1>0$ and $\alpha_2>0$ are satisfied.

In this manner, the driving member 130 applies a driving force of the aforementioned driving frequency as determined by the control unit 120, to the second oscillation movable element 102 through an electromagnetic method based on an electromagnetic force, an electrostatic method using electrostatic attraction, a piezoelectric method using a piezo-vibration energy and so on.

In the electromagnetic method, one of a permanent magnet and a magnetic coil may be provided on the movable element, and the other may be disposed at a stationary side opposed to this. A driving signal of the above-described driving frequency may be applied to the magnetic coil from the driving member 130, whereby the oscillation system 100 can be driven.

In the electrostatic method, electrodes may be provided at the movable element and the stationary side opposed to this, respectively, and a driving signal of the above-described driving frequency may be applied to an electrode from the driving member 130, whereby the oscillation system 100 can be driven.

In the piezoelectric method, a piezoelectric element may be provided and a driving signal of the above-mentioned driving frequency may be applied to the piezoelectric element from the driving member 130. Oscillation produced thereby is utilized.

Here, the driving signal generated by the driving member 130 is a composite signal of periodic signals such as sinusoidal signals of the above-described driving frequencies or pulse signals.

On the basis of the relationship of Equation (2) and in accordance with the amount of deviation from the integral-number ratio of 1:2 of the resonance frequency ratio, while keeping the ratio of the driving frequencies at 1:2, the amount of deviation from the associated resonance frequency of each driving frequency is distributed as follows. Namely, the driving frequency corresponding to the resonance frequency having a larger Q-value is made comparatively close to this resonance frequency, and the other is made comparatively remote from the resonance frequency. In this case, according to the relationship of Equation (2), one of the driving frequencies is made smaller than the associated resonance frequency, whereas the other driving frequency is made larger than the associated resonance frequency.

In the present embodiment the set driving frequencies $Df_1$ and $Df_2$ are made to have a frequency ratio 1:2. This is because the ratio of resonance frequency $f_1$ and the resonance frequency $f_2$ is approximately 1:2 (namely, $f_2$ is made approximately two-fold of $f_1$). If the ratio of the resonance frequency $f_1$ and the resonance frequency $f_2$ is approximately 1:3 (namely, $f_2$ is approximately three-fold of $f_1$), the set driving frequencies $Df_1$ and $Df_2$ may be made with a frequency ratio 1:3.

As described above, when the ratio of the resonance frequency $f_1$ and the resonance frequency $f_2$ is approximately 1: N (N is a natural number), the set driving frequencies $Df_1$ and $Df_2$ are made to have a frequency ratio of 1: N (namely, Df2 is made a multiple of Df1 by a natural number (Df1=N×Df1)), and N in Equation (2) may take the same value. The present embodiment is thus applied.

With the use of an optical deflector of the present embodiment, when a plurality of oscillation movable elements are going to oscillate, the driving force for producing the oscillation of the oscillation movable elements can be distributed appropriately. In this manner, the optical scanning (e.g., optical scanning in which the scanning angle changes like an approximately sawtooth wave) by the oscillation of an arbitrary and desired movable element having components of two frequencies can be accomplished with a low driving energy as a total. In other words, while maintaining the integral-number ratio, the frequency of the driving signal for oscillating each oscillation movable element is appropriately set around each resonance frequency. Base on this, oscillation of an arbitrary movable element having a plurality of frequency components, having an integral-number ratio of mutual resonance frequencies, can be accomplished with a lower driving energy in total.

Second Embodiment

An optical deflector according to a second embodiment of the present invention will be explained. The block diagram of the optical deflector of the present embodiment is the same as one shown in FIG. 1. In this embodiment, the driving frequencies $Df_1$ and $Df_2$ are set like the first embodiment, and yet the conditions to be explained below are satisfied.

Figure 3A:
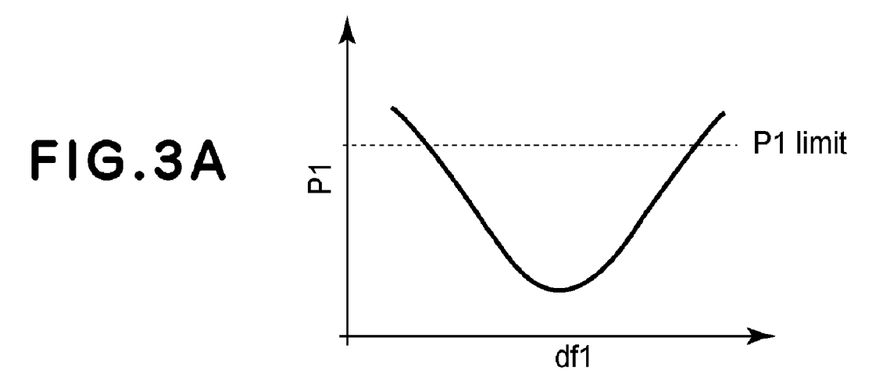
FIGS. 3A, 3B and 3C are diagrams which illustrate the relationship of the driving frequency and the electric power.
Figure 3B:
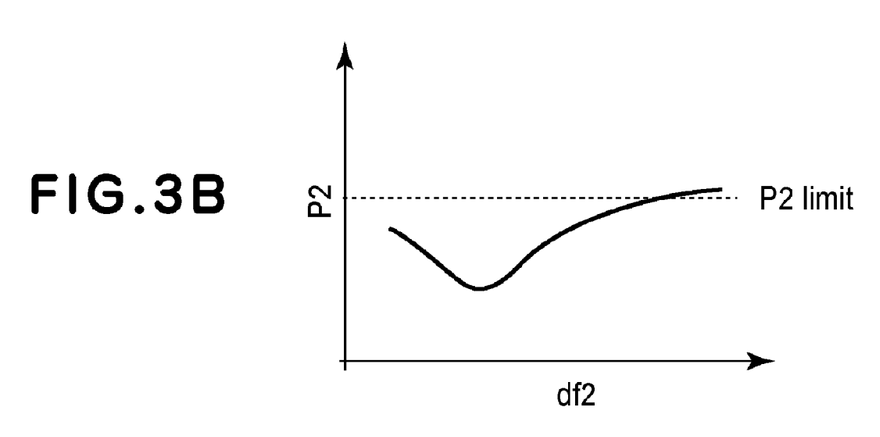

FIG. 3A shows a driving electric power $P_1(df_1)$ necessary for the driving frequency $df_1$ when the first natural oscillation mode reaches a target amplitude. FIG. 3B illustrates a driving electric power $P_2(df_2)$ necessary for the driving frequency $df_2$ when the second natural oscillation mode reaches a target amplitude. With regard to the electric power necessary for that each natural oscillation mode reaches its target amplitude, since there is a maximum allowable value for the driving member 130, the power has to be limited. In consideration of this, when the maximum allowable value for the first natural oscillation mode is denoted by $P_{1limit}$, and the maximum allowable value for the second natural oscillation mode is denoted by $P_{2limit}$, the set driving frequencies $Df_1$ and $Df_2$ are so determined that the driving electric powers are kept not greater than $P_{1limit}$ and $P_{2limit}$. Namely, when $df_2=2\times df_1$, the driving frequencies are set to satisfy Equation (3) below.

$$P_1(df_1) < P_{1limit}$$

$$P_2(df_2) < P_{2limit} \qquad (3)$$

In other words, in this embodiment, the control unit 120 sets the driving frequencies under the condition that the driving electric powers necessary for the driving frequencies when the natural oscillation modes reach their target amplitudes are made smaller than the maximum allowable value of the driving electric power, and under the condition that the relationship of a multiple by a natural-number described hereinbefore is satisfied. Then, the frequencies so determined are taken as the set driving frequencies $Df_1$ and $Df_2$.

With this arrangement, driving beyond the maximum allowable value of the driving member 130 can be avoided.

Next, a method of determining the set driving frequencies Df1 and Df2 at higher efficiency will be explained.

Figure 3C:
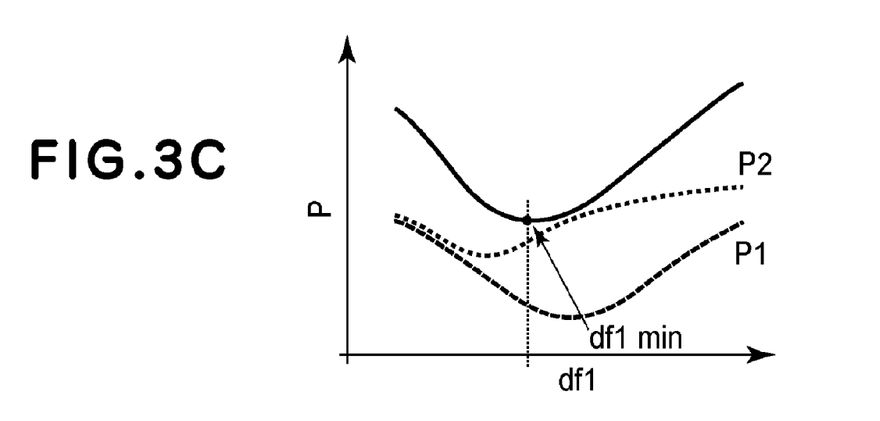

FIG. 3C shows an electric power P for simultaneously exciting both modes, that is, $P_1(df_1)+P_2(2\times df_1)$. As shown in FIG. 3C, the point where $df_1$ corresponds to $df_{1min}$ is the point where the oscillation system 100 can be driven with a desired amplitude and with a lowest electric power. Thus, the control unit 120 determines the set driving frequencies $Df_1$ and $Df_2$ in accordance with Equation (4) below.

$$Df_1 = df_{1min}$$

$$Df_2 = 2 \times df_{1min} \qquad (4)$$

In other words, the control unit 120 determines the driving frequency corresponding to the first natural oscillation mode under the condition that the grand total of the driving electric powers necessary for the driving frequencies when the natural oscillation modes reach their target amplitudes is minimized and under the condition that the relationship of a multiple of a natural number described hereinbefore is satisfied. Then, the thus determined frequency is taken as the first set driving frequency, and then another set driving frequency is determined by multiplying the first set driving frequency by a natural number. This condition may be satisfied together with the condition of Equation (3) mentioned hereinabove.

The driving member 130 applies driving force of the driving frequency determined by the control unit 120 as described above, to the oscillator 102 in accordance with an electromagnetic method, an electrostatic method or a piezoelectric method.

With the use of an optical deflector of the present embodiment, when a plurality of oscillation movable elements are going to oscillate, an electric power for producing oscillation of the oscillation movable elements can be distributed appropriately. In this manner, desired optical scanning having components of two frequencies can be accomplished with a low electric power as a total.

In the present embodiment, optimal values similar to those of Equation (4) may preferably be taken as the set driving frequencies $Df_1$ and $Df_2$. However, similar advantageous results are attainable if the set driving frequencies Df1 and Df2 are determined in a range similar to that of Equation (3).

Third Embodiment

An optical deflector according to a third embodiment will be explained. The block diagram of the optical deflector of the present embodiment is the same as one shown in FIG. 1. In the present embodiment, the driving frequencies $Df_1$ and $Df_2$ are set like the first embodiment, and yet the conditions to be explained below are satisfied.

Figure 4A:
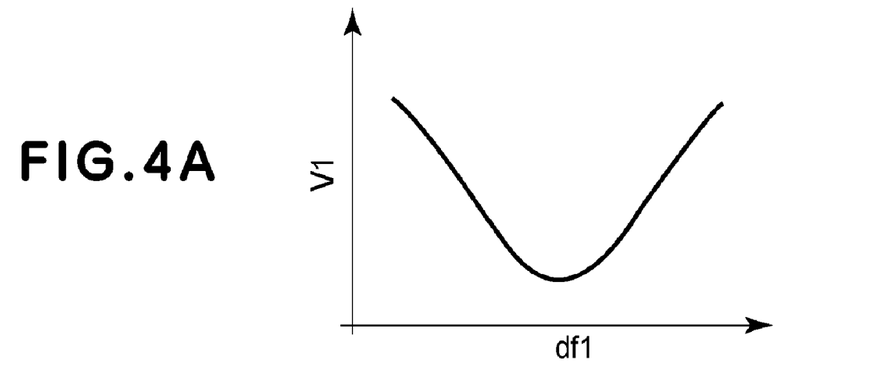
FIGS. 4A, 4B and 4C are diagrams which illustrate the relationship of the driving frequency and the electric voltage.
Figure 4B:
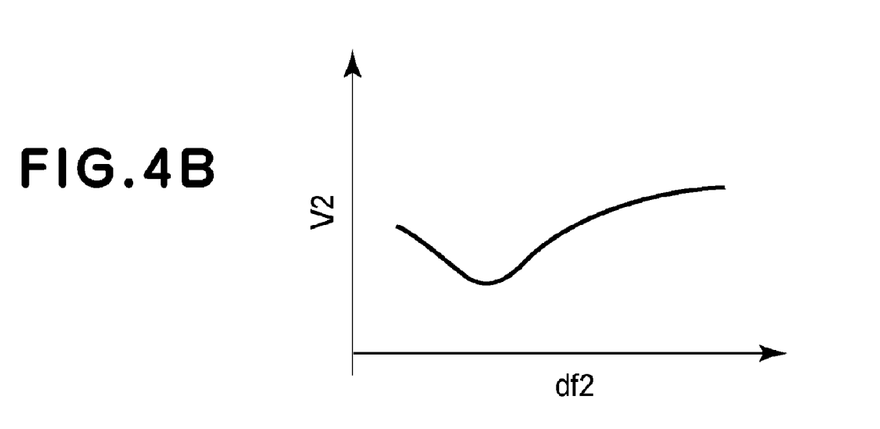
Figure 4C:
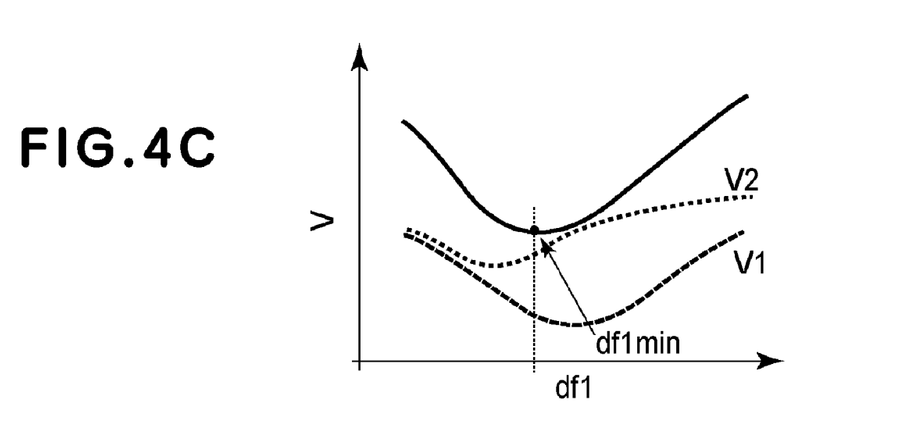

FIG. 4A shows a driving electric voltage $V_1(df_1)$ necessary for the driving frequency $df_1$ when the first natural oscillation mode reaches a target amplitude. FIG. 4B illustrates a driving electric voltage $V_2(df_2)$ necessary for the driving frequency $df_2$ when the second natural oscillation mode reaches a target amplitude. FIG. 4C shows a voltage V necessary for exciting these modes simultaneously, that is, $|V_1(df_1)+V_2(2\times df_1)|$. As shown in FIG. 4C, the point where $df_1$ is equal to $df_{1min}$ is the point where the oscillation system 100 can be driven at a desired amplitude and with a lowest voltage. Thus, the control unit 120 determines the set driving frequencies $Df_1$ and $Df_2$ in accordance with Equation (5) below.

$$Df_1 = df_{1min}$$

$$Df_2 = 2 \times df_{1min} \qquad (5)$$

In other words, the control unit 120 sets the driving frequency of the first natural oscillation mode under the condition that the absolute value of the ground total of the driving electric voltages necessary for the driving frequencies when the natural oscillation modes reach their target amplitudes is minimized, and under the condition that the relationship of a multiple by a natural-number described hereinbefore is satisfied. Then, the frequency so determined is taken as the first set driving frequency, and then another set driving frequency is determined by multiplying the first set driving frequency by a natural number.

The driving member 130 applies a driving force of the driving frequency determined by the control unit 120 as described above, to the oscillator 102 in accordance with an electromagnetic method, an electrostatic method or a piezoelectric method.

With the use of an optical deflector of the present embodiment, when a plurality of oscillation movable elements are going to oscillate, an electric voltage for producing oscillation of the oscillation movable elements can be distributed appropriately. In this manner, desired optical scanning having components of two frequencies can be accomplished with a low electric voltage as a total.

Fourth Embodiment

Figure 5:
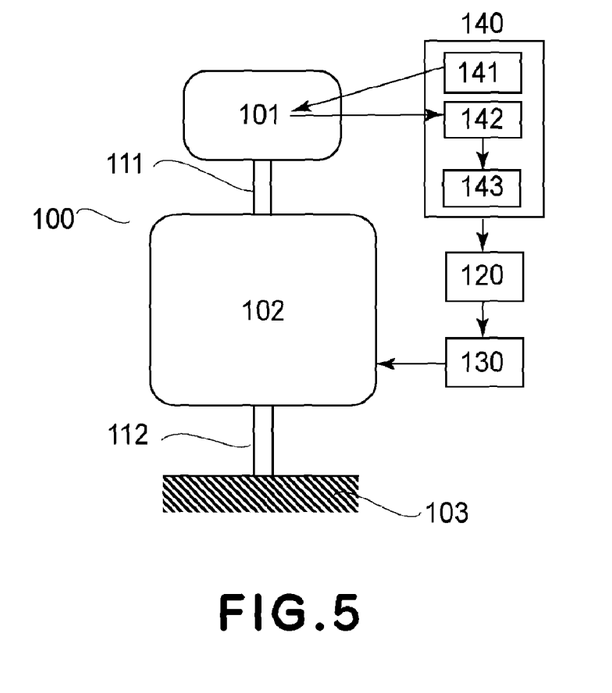
FIG. 5 is a block diagram of an optical deflector according to a fourth embodiment of the present invention.

FIG. 5 is a block diagram showing an optical deflector according to a fourth embodiment of the present invention. The structure of this embodiment except a resonance frequency detecting element 140 is similar to the first embodiment.

As has been described hereinbefore, the resonance frequency of natural oscillation modes varies due to a manufacturing error of or a change in the shape of the oscillation system 100 resulting from an environment temperature change or variation with respect to time. In consideration of this, in this embodiment, the resonance frequency detecting element 140 is used to detect the resonance frequencies $f_1$ and $f_2$ of the oscillation system 100. The control unit 120 stores the resonance frequencies $f_1$ and $f_2$ in response to an output of the resonance frequency detecting element 140, and determines the set driving frequencies $Df_1$ and $Df_2$ in accordance with a method similar to that having been explained with reference to the preceding embodiments. The driving member 130 applies a driving force of the driving frequency determined by the control unit 120 as described above, to the oscillator 102 in accordance with an electromagnetic method, an electrostatic method or a piezoelectric method.

In the present embodiment, the resonance frequency detecting element 140 comprises a laser source 141, a photodetector 142, and a frequency arithmetic unit 143. The laser beam emitted from the laser source 141 is deflected by first oscillation movable element 101. The deflected light is incident on the photodetector 142. The photodetector 142 is a position sensor which can detect the position of the deflected light, and it produces and applies an amplitude signal corresponding to the amplitude of oscillation of the first oscillation movable element 101 to the frequency arithmetic unit 143. The frequency arithmetic unit 143 then determines a driving signal to be supplied to the driving member 130, through the control unit 120.

In the structure described above, the frequency arithmetic unit 143 calculates the resonance frequencies $f_1$ and $f_2$ of the oscillation system 100 based on the output of the photodetector 142 and the driving signal mentioned above. More specifically, it sweeps the frequency of the driving signal to be supplied to driving member 130, around possible resonance frequencies of the natural oscillation modes, and detects the resonance frequencies with which the frequencies of the driving signal at the point where the output of the amplitude signal of the photodetector 142 reaches a maximum define the resonance frequencies $f_1$ and $f_2$.

In this embodiment, the method of detecting the frequency uses a laser source 141, photodetector 142, and frequency arithmetic unit 143. However, a method such as follows may be used. That is, electrodes may be provided at an oscillation movable element and at a position opposed thereto to constitute a capacitor, and the resonance frequencies $f_1$ and $f_2$ may be detected by detecting a change in the electrostatic capacitance. Alternatively, an electric coil may be provided on the oscillation movable element while a permanent magnet may be provided at a stationary member opposed to it. Then, the resonance frequencies $f_1$ and $f_2$ may be detected by detecting an induced electromotive force of the electric coil. Furthermore, a magnet may be provided on the oscillation movable element and an electric coil may be provided at a stationary member opposed to it, and the resonance frequencies $f_1$ and $f_2$ may be detected by detecting the induced electromotive force of the electric coil. Namely, the amplitude of the oscillation movable element may be detected in accordance with these methods, and the resonance frequency may be calculated based on it.

With the use of an optical deflector according to the present embodiment, the driving frequency of arbitrary and desired optical scanning having two frequency components can be determined without measuring the resonance frequency of oscillation system 100 beforehand.

Fifth Embodiment

The present invention can be applied to an oscillator device comprising an oscillation system having three oscillation movable elements.

Figure 6:
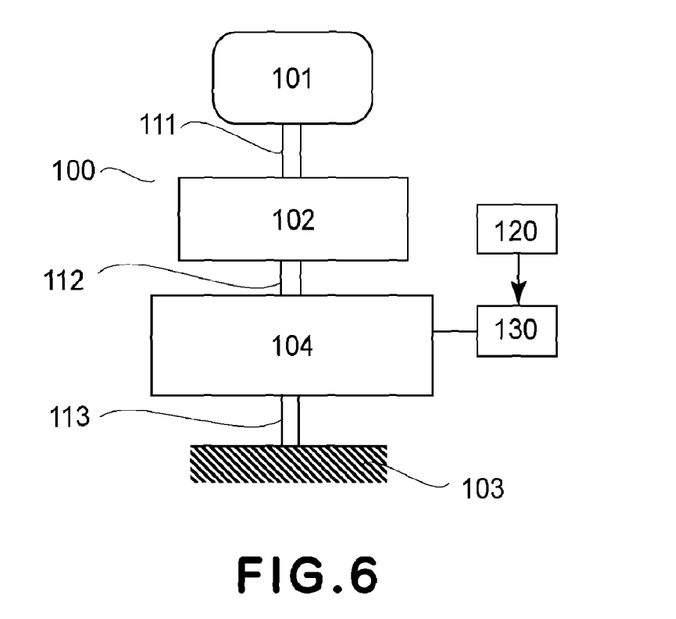
FIG. 6 is a block diagram of an optical deflector according to a fifth embodiment of the present invention.

The fifth embodiment concerns such an oscillator device. FIG. 6 is block diagram of the optical deflector according to the fifth embodiment. In the optical deflector of the present embodiment, a first oscillation movable element 101 having an optical deflecting element such as a reflection surface is supported by a first elastic supporting element 111, for torsional oscillation relative to a second oscillation movable element 102 and around an oscillation axis. The second oscillation movable element 102 is supported by a second elastic supporting element 112, for torsional oscillation relative to a third oscillation movable element 104 and around the oscillation axis. The third oscillation movable element 104 is supported by a third elastic supporting element 113, for torsional oscillation relative to the support member 103 and around the oscillation axis. The oscillation system 100 has a first natural oscillation mode and a second natural oscillation mode of different frequencies, around the oscillation axis.

Here, the resonance frequency of the first natural oscillation mode is denoted by $f_1$, the resonance frequency of the second natural oscillation mode is denoted by $f_2$, and the resonance frequency of the third natural oscillation mode is denoted by $f_3$, respectively. Here, the oscillation system 100 is structured beforehand so that the resonance frequencies $f_1$, $f_2$ and $f_3$ are in an approximately 1: M:N relationship, where M and N are natural numbers so that there is a ratio of 1:2:3, for example). Here, the "approximately 1: M:N relationship" of $f_1$, $f_2$ and $f_3$ means that, when M and N are integers not less than 2, the following relations are satisfied.

$$0.98M \leq f_2/f_1 \leq 1.02M$$

(where a case $f_2/f_1 = M$ is excluded)

$$0.98N \leq f_3/f_1 \leq 1.02N$$

(where a case $f_3/f_1 = N$ is excluded)

$$M \neq N$$

As described above, the resonance frequency of the natural oscillation modes changes due to a manufacturing error of or a change in the shape of the oscillation system 100 resulting from an environment temperature change or variation with respect to time. In the present embodiment, the driving frequency is set to meet such a change, and the oscillation system 100 is driven in desired manner based on it.

A method of setting the driving frequency in the present embodiment will be explained. In this embodiment as well, the driving frequency is set based on the sharpness of the resonance peak. The value Q depicting the sharpness of the resonance peak is just what has been explained with reference to the first embodiment.

Here, the sharpness of the resonance peaks of the first to third natural oscillation modes is denoted by Q1, Q2 and Q3. In the present embodiment, the resonance frequencies $f_1$, $f_2$ and $f_3$ of the oscillation system 100 should preferably have just a ratio of 1: M:N. Actually, however, there occurs an error due to a manufacturing error of the movable element or the elastic supporting element. Therefore, when the oscillation system is going to be driven at the driving frequencies having a ratio of 1: M:N, it has to be driven with driving frequencies being deviated from the resonance frequencies. Even in the present embodiment, weighting is carried out with respect to the degree of fewness of deviation of the driving frequency from the resonance frequency based on the sharpness Q1, Q2 and Q3 of the resonance peak, and the driving frequencies are set around respective resonance frequencies so that the driving frequency ratio is set in a predetermined relationship.

More specifically, the control unit 120 stores therein the resonance frequencies $f_1$, $f_2$ and $f_3$ and sharpness $Q_1$, $Q_2$ and $Q_3$ of the resonance peaks, in response to an external output. Then, for simultaneous excitation of the three natural oscillation modes of the oscillation system 100, the control unit 120 determines the set driving frequencies $Df_1$, $Df_2$ and $Df3$ ($Df_2=M\times Df_1$ and $Df_3=N\times Df_1$) having three frequencies of a frequency ratio of 1: M:N, on the basis of the relationship of Equation (6) below.

$$Df_1=(\alpha_1\times N\times M\times f_1+\alpha_2\times N\times f_2+\alpha_3\times M\times f_3)/MN$$

$$Df_2=(\alpha_1\times N\times M\times f_1+\alpha_2\times N\times f_2+\alpha_3\times M\times f_3)/N$$

$$Df_3=(\alpha_1\times N\times M\times f_1+\alpha_2\times N\times f_2+\alpha_{3\times M}\times f_3)/M \quad (6)$$

$$\alpha_1+\alpha_2+\alpha_3=1$$

$$\alpha_1>0$$

$$\alpha_2>0$$

$$\alpha_3>0$$

$$\alpha_1=Q_1/(Q_1+Q_2+Q_3)$$

$$\alpha_2=Q_2/(Q_1+Q_2+Q_3)$$

As described above, in this embodiment as well, when the sharpness of the resonance peak of the natural oscillation modes is denoted by Qi (i is 1, 2 or 3), the control unit 120 determines the aforementioned coefficient $\alpha_i$ as the value obtained by dividing a corresponding Qi by a ground total of Q.

On the basis of the relationship of Equation (6) above and in accordance with the amount of deviation from the integral-number ratio of 1: M:N of the resonance frequency ratio, while keeping the ratio of the driving frequencies at 1: M:N, the amount of deviation from the associated resonance frequency of each driving frequency is distributed as follows. Namely, the driving frequency corresponding to the resonance frequency having a larger Q-value is made comparatively close to this resonance frequency, and the other is made comparatively remote from the resonance frequency. In this case, according to the relationship of Equation (6), one of the driving frequencies is made smaller than the associated resonance frequency, whereas the other driving frequency is made larger than the associated resonance frequency.

With the use of an optical deflector of the present embodiment, when a plurality of oscillation movable elements are going to oscillate, the driving force for producing the oscillation of the oscillation movable elements can be distributed appropriately. In this manner, the optical scanning by the oscillation of an arbitrary and desired movable element having components of three frequencies can be accomplished with a low driving energy as a total. In other words, while maintaining the integral-number ratio, the frequency of the driving signal for oscillating each oscillation movable element is appropriately set around each resonance frequency. Base on this, oscillation of an arbitrary movable element having a plurality of frequency components, having an integral-number ratio of mutual resonance frequencies, can be accomplished with a lower driving energy in total.

It should be noted that the method having been explained with reference to the first to fourth embodiments may be easily adopted in the present embodiment as well.

Sixth Embodiment

Figure 7:
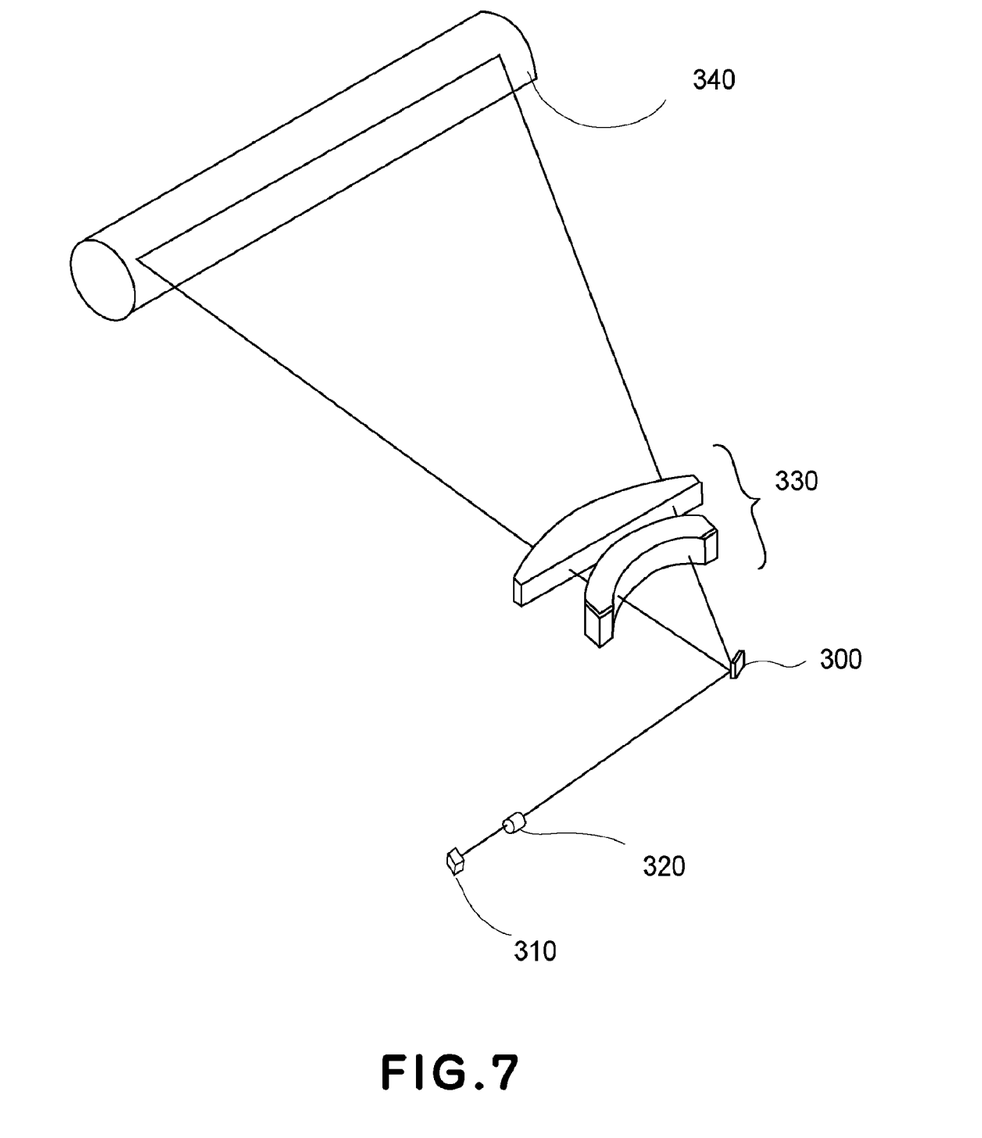
FIG. 7 is a perspective structural view of an image forming apparatus according to a sixth embodiment of the present invention.

An image forming apparatus according to a sixth embodiment of the present invention will be explained. The block diagram of the optical deflector of the present embodiment is similar to that shown in FIG. 1, for example. The structure of the present embodiment is illustrated in FIG. 7.

The image forming apparatus of the present embodiment comprises an optical deflector according to the present invention as well as at least an optical system, a light source and a photosensitive member. The light beam from the light source is scanningly deflected by an optical deflector, and the scanning light is collected at a target position on the photosensitive member, by the optical system. The light beam emitted from light source 310 is shaped by a collimator lens 320 and, after that, it is deflected one-dimensionally by an optical deflector 300. The scanning light is imaged on the photosensitive member 340 through a coupling lens 330. In the optical deflector 300, the set driving frequencies $Df_1$ and $Df_2$ (alternatively, $Df_1$, $Df_2$ and $Df_3$) are determined in accordance with the method of the embodiments described hereinbefore.

With the use of an image forming apparatus of the present embodiment, arbitrary and desired optical scanning (e.g., optical scanning in which the scan angle changes like a sawtooth wave) having two (or alternatively three) frequency components suitable for image formation can be realized. Furthermore, the driving force for producing oscillation of the oscillation movable elements can be distributed appropriately, such that arbitrary optical scanning can be done with a low driving force as a total.

The invention claimed is:

1. An oscillator device including an oscillation system, a driving member configured to drive said oscillation system, and a control device configured to determine a driving force to be applied from said driving member to said oscillation system, characterized in that:
   said oscillation system includes a first oscillation movable element, a second oscillation movable element and a support member;
   said first oscillation movable element is supported by a first elastic supporting element, for torsional oscillation relative to said second oscillation movable element and around an oscillation axis;
   said second oscillation movable element is supported by a second elastic supporting element, for torsional oscillation relative to said support member and around the oscillation axis;
   said oscillation system has first and second natural oscillation modes of different frequencies around the oscillation axis, wherein, when a resonance frequency of the first natural oscillation mode is $f_1$ while a resonance frequency of the second natural oscillation mode is $f_2$ and N is an integer not less than 2, a relation $$0.98N \leq f_2/f_1 \leq 1.02N$$

(where a case $f_2/f_1=N$ is excluded)
   is satisfied;
   said control device is arranged to determine set driving frequencies $Df_1$ and $Df_2$ in accordance with relations $$Df_1=(\alpha_1\times N\times f_1+\alpha_2\times f_2)/N$$

$$Df_2=(\alpha_1\times N\times f_1+\alpha_2\times f_2)$$

$$\alpha_1+\alpha_2=1$$

$$\alpha_1>0$$

$$\alpha_2>0$$

and so as to satisfy a relation $$Df_2=N\times Df_1; \text{ and}$$

said oscillation system is driven by said driving member in accordance with the set driving frequencies $Df_1$ and $Df_2$.

2. An oscillator device according to claim 1, wherein, when a resonance frequency at a resonance peak is $f_a$, a frequency with which an oscillation energy at a low-frequency side of the resonance peak becomes equal to a half value of the resonance peak is $f_b$, a frequency with which the oscillation energy at a high-frequency side of the resonance peak becomes equal to a half value of the resonance peak is $f_c$, a value which represents sharpness of the resonance peak is Q satisfying a relation $Q=f_a/(f_c-f_b)$, and the sharpness of the resonance peak of each of the natural oscillation modes is $Q_i$ (i is 1 and 2),
said control device calculates $\alpha_1$, $\alpha_2$ by $$\alpha_1=Q_1/(Q_1+Q_2)$$

$$\alpha_2=Q_2/(Q_1+Q_2).$$

3. An oscillator device according to claim 1, wherein, when a resonance frequency at a resonance peak is $f_a$, a frequency with which an oscillation energy at a low-frequency side of the resonance peak becomes equal to a half value of the resonance peak is $f_b$, a frequency with which the oscillation energy at a high-frequency side of the resonance peak becomes equal to a half value of the resonance peak is $f_c$, and a value which represents sharpness of the resonance peak is Q satisfying a relation $Q=f_a/(f_c-f_b)$, $\alpha_1$ and $\alpha_2$ are determined so as to satisfy a relation $\alpha_1<\alpha_2$ on condition that the sharpness $Q_1$ of the resonance peak of the first natural oscillation mode is smaller than the sharpness $Q_2$ of the peak of the resonance frequency of the second natural oscillation mode, whereas $\alpha_1$ and $\alpha_2$ are determined so as to satisfy a relation $\alpha_1>\alpha_2$ on condition that the sharpness $Q_1$ of the resonance peak of the first natural oscillation mode is larger than the sharpness $Q_2$ of the peak of the resonance frequency of the second natural oscillation mode.

4. An oscillator device according to claim 1, wherein said control device sets the driving frequencies so that a driving electric power required for each driving frequency when the natural oscillation modes reach respective target amplitudes is made lower than a maximum allowable value for the driving electric power.

5. An oscillator device according to claim 1, wherein said controller determines as a first set drive frequency a drive frequency corresponding to the first natural oscillation mode so that $P_1(Df_1)+P_2(Df_2)$ is minimum, and determines a second setting drive frequency by multiplying the first set drive frequency by N,
wherein $P_1(Df_1)$ is a driving electric power at which a target amplitude is provided in the natural oscillation mode when said oscillator is driven at a frequency $Df_1$, $P_2(Df_2)$ is a driving electric power at which a target amplitude is provided in the natural oscillation mode when said oscillator is driven at a frequency $Df_2$, where $N \times Df_1 = Df_2$.

6. An oscillator device according to claim 1, wherein said controller determines as a first set drive frequency a drive frequency corresponding to the first natural oscillation mode so that $V_1(Df_1)+V_2(Df_2)$ is minimum, and determines a second setting drive frequency by multiplying the first set drive frequency by N,
wherein $V_1(Df_1)$ is a driving voltage at which a target amplitude is provided in the natural oscillation mode when said oscillator is driven at a frequency $Df_1$, $V_2(Df_2)$ is a driving voltage at which a target amplitude is provided in the natural oscillation mode when said oscillator is driven at a frequency $Df_2$, where $N \times Df_1 = Df_2$.

7. An oscillator device according to claim 1, further comprising a resonance frequency detecting device configured to detect a resonance frequency of said oscillation system.

8. An oscillator device according to claim 1, wherein N is equal to 2 or 3.

9. An optical deflector including an oscillator device as recited in claim 1, wherein said first oscillation movable element has an optical deflecting element.

10. An image forming apparatus including an optical deflector as recited in claim 9, an optical system, a light source and a photosensitive member, wherein a light beam from said light source is scanningly deflected by said optical deflector, and the scanningly deflected light is collected at a target position on said photosensitive member by said optical system.

11. An oscillator device including an oscillation system, a driving member configured to drive said oscillation system, and a control device configured to determine a driving force to be applied from said driving member to said oscillation system, characterized in that:
said oscillation system includes a first oscillation movable element, a second oscillation movable element, a third oscillation movable element and a support member;
said first oscillation movable element is supported by a first elastic supporting element, for torsional oscillation relative to said second oscillation movable element and around an oscillation axis;
said second oscillation movable element is supported by a second elastic supporting element, for torsional oscillation relative to said third elastic supporting element and around the oscillation axis;
said third oscillation movable element is supported by a third elastic supporting element, for torsional oscillation relative to said support member and around the oscillation axis;
said oscillation system has first, second and third natural oscillation modes of different frequencies around the oscillation axis, wherein, when a resonance frequency of the first natural oscillation mode is $f_1$, a resonance frequency of the second natural oscillation mode is $f_2$, a resonance frequency of the third natural oscillation mode is $f_3$, and M and N are integers not less than 2, relations $$0.98M \leq f_2/f_1 \leq 1.02M$$

(where a case $f_2f_1=M$ is excluded)

$$0.98N \leq f_3/f_1 \leq 1.02N$$

(where a case $f_3f_1=N$ is excluded)

$$M \neq N$$

are satisfied;
said control device is arranged to determine set driving frequencies $Df_1$, $Df_2$ and $Df_3$ in accordance with relations $$Df_1=(\alpha_1 \times N \times M \times f_1 + \alpha_2 \times N \times f_2 + \alpha_3 \times M \times f_3)/MN$$

$$Df_2=(\alpha_1 \times N \times M \times f_1 + \alpha_2 \times N \times f_2 + \alpha_3 \times M \times f_3)/N$$

$$Df_3=(\alpha_1 \times N \times M \times f_1 + \alpha_2 \times N \times f_2 + \alpha_3 \times M \times f_3)/M$$

$$\alpha_1+\alpha_2+\alpha_3=1$$

$$\alpha_1>0$$

$$\alpha_2>0$$

$$\alpha_3>0$$

and so as to satisfy relations $$Df_2 = M \times Df_1$$

$$Df_3 = N \times Df_1; \text{ and}$$

said oscillation system is driven by said driving member in accordance with the set driving frequencies $Df_1$, $Df_2$ and $Df_3$.

12. An oscillator device according to claim 11, wherein, when a resonance frequency at a resonance peak is $f_a$, a frequency with which an oscillation energy at a low-frequency side of the resonance peak becomes equal to a half value of the resonance peak is $f_b$, a frequency with which the oscillation energy at a high-frequency side of the resonance peak becomes equal to a half value of the resonance peak is $f_c$, a value which represents sharpness of the resonance peak is Q satisfying a relation $Q = f_a/(f_c - f_b)$, and the sharpness of the resonance peak of each of the natural oscillation modes is $Q_i$ (i is 1, 2 and 3), said control device calculates $\alpha_1$, $\alpha_2$, $\alpha_3$ by $$\alpha_1 = Q_1/(Q_1 + Q_2 + Q_3)$$

$$\alpha_2 = Q_2/(Q_1 + Q_2 + Q_3)$$

$$\alpha_3 = Q_3/(Q_1 + Q_2 + Q_3).$$

\* \* \* \* \*